United States Patent
Milne et al.

(10) Patent No.: US 11,240,574 B2
(45) Date of Patent: Feb. 1, 2022

(54) NETWORKED SPEAKER SYSTEM WITH AUDIO NETWORK BOX

(71) Applicant: Sony Corporation, Tokyo (JP)

(72) Inventors: James R. Milne, Ramona, CA (US); Gregory Carlsson, Santee, CA (US); Tomohiro Koyata, San Diego, CA (US); Tonni Sandager Larsen, San Diego, CA (US)

(73) Assignee: Sony Corporation, Tokyo (JP)

( * ) Notice: Subject to any disclaimer, the term of this patent is extended or adjusted under 35 U.S.C. 154(b) by 51 days.

(21) Appl. No.: 16/216,725

(22) Filed: Dec. 11, 2018

(65) Prior Publication Data
US 2020/0186899 A1  Jun. 11, 2020

(51) Int. Cl.
| H04R 1/00 | (2006.01) |
| H04R 3/00 | (2006.01) |
| H04L 12/40 | (2006.01) |
| H04W 88/12 | (2009.01) |
| H04L 12/28 | (2006.01) |

(52) U.S. Cl.
CPC ............ *H04R 1/00* (2013.01); *H04L 12/2856* (2013.01); *H04L 12/40117* (2013.01); *H04R 3/00* (2013.01); *H04W 88/12* (2013.01); *H04R 2420/07* (2013.01); *H04R 2420/09* (2013.01)

(58) Field of Classification Search
CPC combination set(s) only.
See application file for complete search history.

(56) References Cited

U.S. PATENT DOCUMENTS

| 4,479,238 | A | * | 10/1984 | Spector | H03G 5/04 361/725 |
| 5,255,322 | A | * | 10/1993 | Farinelli | H04R 3/12 361/729 |
| 5,483,371 | A | * | 1/1996 | Farinelli, Jr. | H04N 7/22 348/E7.094 |
| 6,459,799 | B1 | * | 10/2002 | Smits | H04R 5/02 381/116 |
| 9,531,550 | B2 | * | 12/2016 | Jabbaz | G06F 1/266 |
| 10,623,859 | B1 | * | 4/2020 | Milne | H04R 5/04 |
| 2008/0118088 | A1 | * | 5/2008 | Ketterer | H04R 5/02 381/119 |
| 2015/0208187 | A1 | * | 7/2015 | Carlsson | H04R 5/02 381/79 |
| 2017/0164089 | A1 | * | 6/2017 | Lee | H04R 1/1025 |

(Continued)

FOREIGN PATENT DOCUMENTS

| FR | 3049804 B1 | 5/2018 |
| WO | 2018145101 A1 | 8/2018 |

OTHER PUBLICATIONS

"Netgenium IP Audio Gateway", Netgenium, Jul. 2018, retrieved from netgenium.co.uk/wp-content/uploads/2018/07/AUG3201-DataSheet.pdf.

*Primary Examiner* — Angelica M McKinney
(74) *Attorney, Agent, or Firm* — John L. Rogitz

(57) ABSTRACT

An audio network box is provided as a master for a networked speaker system. The audio box can be configured with different combinations of modules to provide functionality as may be desired by an end user. The modules may include a power over Ethernet module, a wireless communication module/access point (AP) module, and an analog speaker module.

6 Claims, 12 Drawing Sheets

(56) References Cited

U.S. PATENT DOCUMENTS

| | | | |
|---|---|---|---|
| 2017/0238114 A1* | 8/2017 | Milne | H04R 3/14 |
| | | | 381/79 |
| 2018/0187447 A1* | 7/2018 | Gharabegian | F21V 33/0004 |
| 2019/0037173 A1* | 1/2019 | Lee | H04W 76/15 |
| 2020/0112806 A1* | 4/2020 | Shiner | H04R 3/14 |
| 2020/0128324 A1* | 4/2020 | Milne | H04S 3/002 |
| 2020/0228901 A1* | 7/2020 | Baek | H04R 25/405 |

* cited by examiner

NETWORKED SPEAKER SYSTEM WITH AUDIO NETWORK BOX

FIELD

The present application relates generally to networked speaker systems with audio network boxes.

BACKGROUND

People who enjoy high quality sound, for example in home entertainment systems, prefer to use multiple speakers for providing stereo, surround sound, and other high-fidelity sound.

SUMMARY

As understood herein, an audio system may include a network box that may be thought of as essentially a replacement for an audio video recorder (AVR) in that the network box s modular in the sense that many combinations of circuit cards (functionality) can be swapped in and out of the box to configure a system. This allows for custom installations (system creation) and satisfaction of customer demands over time.

Accordingly, a network box may include two-way communication with network speakers, unlike one-way communication offered by an AVR. The network box may include one or more power over Ethernet (PoE) speaker modules to supply both power and audio streams to speakers. It may also include one or more wireless speaker modules, essentially wireless transceivers for communicating with speakers in the audio system. Moreover, the network box may include one or more analog speaker modules to communicate analog audio data to non-digital (analog) speakers. The network box also may include a system synchronization module and may also include one or more processors accessing one or more computer storages to execute applications provided by the manufacturer of the box and third parties. Understanding that in a network audio system there are two practical architectures to implement: centralized and distributed, present principles may apply to both architectures. In both architectures, there must be a master of the system. The network box may execute self-configuration as the master in a central architecture.

With the configurable network box, custom audio system installers are providing with many configuration options to differentiating customers. End customers are provided with easy expansion of new technologies and features over time, as new modules with new functionality can be added to the box. Essentially, an audio system may be configured or re-configured with various technologies such as PoE speakers, wireless speakers, combinations of both, mixed with analog speakers if desired. The network box can be used as a master to control components other than audio speakers in the home (e.g., a home theater), as well as cooperate with other network boxes.

Modules in the network box may be implemented by circuit cards or by chips ("system on a chip" or SoE) or other configuration.

Accordingly, an assembly includes at least one housing, and at least one network interface in the housing configured to exchange data with a wide area network. The housing has plural regions for configuring the assembly with plural modules. Plural modules are engaged with respective regions in the housing. The plural modules are selected from the group that includes at least one system on a chip (SoC) module having at least one controller, at least one wireless module configured to wirelessly communicate with one or more audio speakers, at least one power over Ethernet (PoE) module configured to supply power and audio data to at least one speaker, and at least one analog module configured to provide analog signals to an analog speaker.

In examples, the modules are selected from the group consisting essentially of at least one system on a chip (SoC) module comprising at least one controller, at least one wireless module configured to wirelessly communicate with one or more audio speakers, at least one power over Ethernet (PoE) module configured to supply power and audio data to at least one speaker, and at least one analog module configured to provide analog signals to an analog speaker.

In some examples, the modules include at least one system on a chip (SoC) module with at least one controller, and at least one wireless module configured to wirelessly communicate with one or more audio speakers. In some examples the modules may include at least one system on a chip (SoC) module with at least one controller, at least one wireless module configured to wirelessly communicate with one or more audio speakers, and at least one power over Ethernet (PoE) module configured to supply power and audio data to at least one speaker.

In some implementations the modules include at least one system on a chip (SoC) module with at least one controller, at least one wireless module configured to wirelessly communicate with one or more audio speakers, at least one power over Ethernet (PoE) module configured to supply power and audio data to at least one speaker, and at least one analog module configured to provide analog signals to an analog speaker.

In example implementations the modules include at least one system on a chip (SoC) module with at least one controller, and at least one power over Ethernet (PoE) module configured to supply power and audio data to at least one speaker. In other implementations the modules include at least one system on a chip (SoC) module with at least one controller, at least one power over Ethernet (PoE) module configured to supply power and audio data to at least one speaker, and at least one analog module configured to provide analog signals to an analog speaker. In examples, the modules can include at least one system on a chip (SoC) module with at least one controller, and at least one analog module configured to provide analog signals to an analog speaker.

In some embodiments at least one of the plural modules is implemented by a circuit card. In some implementations at least one of the plural modules is implemented by a chip.

In another example, a method includes receiving an audio system specification defining plural functions for an audio system. The method also includes configuring an audio box with plural modules to execute plural functions according to the specification. The plural modules are selected from the group that includes at least one system on a chip (SoC) module with at least one controller, at least one wireless module configured to wirelessly communicate with one or more audio speakers, at least one power over Ethernet (PoE) module configured to supply power and audio data to at least one speaker, and at least one analog module configured to provide analog signals to an analog speaker.

In another aspect, a system includes at least one audio box with a housing and plural module disposed in the housing. The modules include at least one system on a chip (SoC) module having at least one controller, at least one wireless module configured to wirelessly communicate with one or more wireless audio speakers, at least one power over Ethernet (PoE) module configured to supply power and audio data to at least one PoE speaker, and at least one analog module configured to provide analog signals to an analog speaker. The modules are configured to communicate with the SoC. The system also includes one or more of: at least one analog speaker communicatively coupled to the at least one analog module to receive analog audio data therefrom, at east one PoE speaker communicatively coupled to the at least one PoE module to receive audio data and power therefrom, and at least one wireless speaker communicatively coupled to the at least one wireless module to execute two-way communication therewith.

The details of the present application, both as to its structure and operation, can be best understood in reference to the accompanying drawings, in which like reference numerals refer to like parts, and in which:

DETAILED DESCRIPTION

Figure 1:
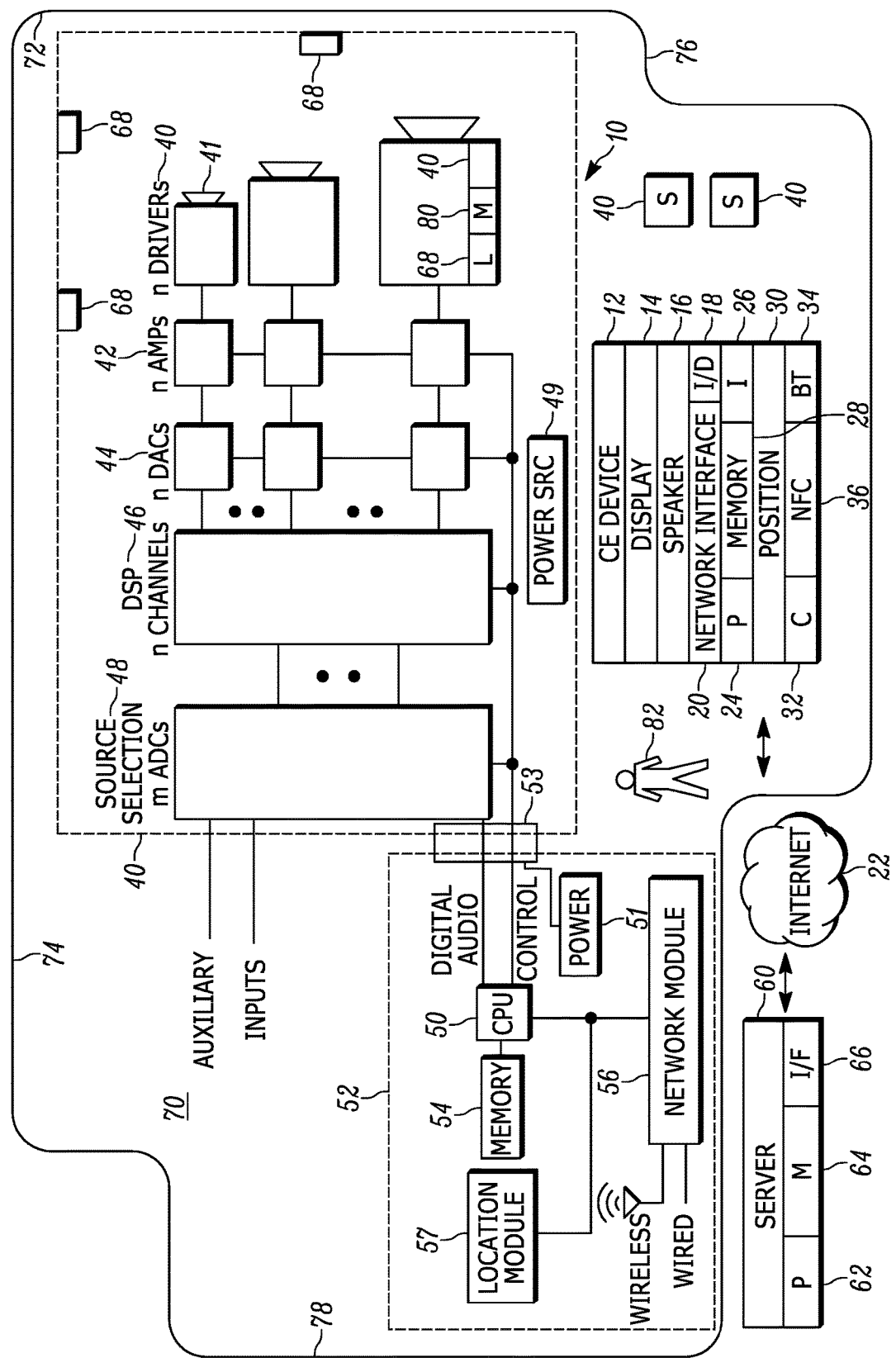
FIG. 1 is a block diagram of an example centralized system.

The present assignee's U.S. patent publication no. 2015/0208187 is incorporated herein by reference. Also incorporated herein by reference are the present assignee's U.S. Pat. Nos. 9,826,332 and 9,693,169.

Also, in addition to the instant disclosure, further details may use Decawave's ultra-wide band (UWB) techniques disclosed in one or more of the following location determination documents, all of which are incorporated herein by reference: U.S. Pat. Nos. 9,054,790; 8,870,334; 8,677,224; 8,437,432; 8,436,758; and USPPs 2008/0279307; 2012/0069868; 2012/0120874. In addition to the instant disclosure, further details on aspects of the below-described rendering including up-mixing and down rendering may use the techniques in any one or more of the following rendering documents, all of which are incorporated herein by reference: U.S. Pat. Nos. 7,929,708; 7,853,022; USPP 2007/0297519; USPP 2009/0060204; USPP 2006/0106620; and Reams, "N-Channel Rendering: Workable 3-D Audio for 4kTV", AES 135 White paper, New York City 2013.

This disclosure relates generally to computer ecosystems including aspects of multiple audio speaker ecosystems. A system herein may include server and client components, connected over a network such that data may be exchanged between the client and server components. The client components may include one or more computing devices that have audio speakers including audio speaker assemblies per se but also including speaker-bearing devices such as portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers. A processor may be implemented by a digital signal processor (DSP), for example.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optic and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example consumer electronics (CE) device 12. The CE device 12 may be, e.g., a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc., and even e.g. a computerized Internet-enabled television (TV). Regardless, it is to be understood that the CE device 12 is configured to undertake present principles (e.g. communicate with other devices to undertake present principles, execute the logic described herein, and perform other functions and/or operations described herein).

Accordingly, to undertake such principles the CE device 12 can be established by some or all of the components shown in FIG. 1. For example, the CE device 12 can include one or more touch-enabled displays 14, one or more speakers 16 for outputting audio in accordance with present principles, and at least one additional input device 18 such as e.g. an audio receiver microphone for e.g. entering audible commands to the CE device 12 to control the CE device 12. The example CE device 12 may also include one or more network interfaces 20 for communication over at least one network 22 such as the Internet, an WAN, an LAN, etc. under control of one or more processors 24. It is to be understood that the processor 24 controls the CE device 12 to undertake present principles, including the other elements of the CE device 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, Wi-Fi transceiver, etc.

In addition to the foregoing, the CE device 12 may also include one or more input ports 26 such as, e.g., a USB port to physically connect (e.g. using a wired connection) to another CE device and/or a headphone port to connect headphones to the CE device 12 for presentation of audio from the CE device 12 to a user through the headphones. The CE device 12 may further include one or more computer memories 28 such as disk-based or solid-state storage that are not transitory signals. Also in some embodiments, the CE device 12 can include a position or location receiver such as but not limited to a GPS receiver and/or altimeter 30 that is configured to e.g. receive geographic position information from at least one satellite and provide the information to the processor 24 and/or determine an altitude at which the CE device 12 is disposed in conjunction with the processor 24. However, it is to be understood that that another suitable position receiver other than a GPS receiver and/or altimeter may be used in accordance with present principles to e.g. determine the location of the CE device 12 in e.g. all three dimensions.

Continuing the description of the CE device 12, in some embodiments the CE device 12 may include one or more cameras 32 that may be, e.g., a thermal imaging camera, a digital camera such as a webcam, and/or a camera integrated into the CE device 12 and controllable by the processor 24 to gather pictures/images and/or video in accordance with present principles. Also included on the CE device 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the CE device 12 may include one or more motion sensors (e.g., an accelerometer, gyroscope, cyclometer, magnetic sensor, infrared (IR) motion sensors such as passive IR sensors, an optical sensor, a speed and/or cadence sensor, a gesture sensor (e.g. for sensing gesture command), etc.) providing input to the processor 24. The CE device 12 may include still other sensors such as e.g. one or more climate sensors (e.g. barometers, humidity sensors, wind sensors, light sensors, temperature sensors, etc.) and/or one or more biometric sensors providing input to the processor 24. In addition to the foregoing, it is noted that in some embodiments the CE device 12 may also include a kinetic energy harvester to e.g. charge a battery (not shown) powering the CE device 12.

In some examples, the CE device 12 may function in connection with the below-described controller or the CE device 12 itself may establish a controller. A controller is used to control multiple ("n", wherein "n" is an integer greater than one) speaker assemblies 40 in respective speaker housings, each of can have multiple drivers 41, with each driver 41 receiving signals from a respective amplifier 42 over wired and/or wireless links to transduce the signal into sound (the details of only a single speaker shown in FIG. 1, it being understood that the other speakers 40 may be similarly constructed). Each amplifier 42 may receive over wired and/or wireless links an analog signal that has been converted from a digital signal by a respective standalone or integral (with the amplifier) digital to analog converter (DAC) 44. The DACs 44 may receive, over respective wired and/or wireless channels, digital signals from a digital signal processor (DSP) 46 or other processing circuit.

The DSP 46 may receive source selection signals over wired and/or wireless links from plural analog to digital converters (ADC) 48, which may in turn receive appropriate audio and/or control signals from a control processor 50 of a master control device 52 as well as power from one or more power supplies 51 in the control device 52. In the example shown, each speaker assembly 40 may include a respective power source 49 such as one or more batteries or voltage transformers or other appropriate power supply, such that each speaker assembly receives both power and audio data from the control device 52 over a respective Ethernet cable 53. Specifically, the power source 49 of a speaker assembly receives power over the Ethernet cable from the power supply 51 of the control device, and audio is received from the control device by each speaker assembly through the Ethernet cable. The power source 49 powers the components of the speaker assembly.

The control processor 50 may access a computer memory 54 such as any of those described above and may also access a network module 56 such as an Ethernet module to permit wired and/or wireless communication with, e.g., the Internet. The control processor 50 may also access a location module 57. The location module 57 may be implemented by a UWB module made by Decawave or it may be implemented using principles discussed herein. One or more of the speakers 40 may also have respective location modules attached or otherwise associated with them. As an example, the master control device 52 may be implemented by an audio video (AV) receiver or by a digital pre-amp processor (pre-pro).

As shown in FIG. 1, the control processor 50 may also communicate with each of the ADCs 48, DSP 46, DACs 44, and amplifiers 42 over respective Ethernet cables. In any case, each speaker assembly 40 can be separately addressed over a network from the other speakers.

More particularly, in some embodiments, each speaker assembly 40 may be associated with a respective network address such as but not limited to a respective media access control (MAC) address. Thus, each speaker may be separately addressed over a network such as the Internet. Wired and/or wireless communication links may be established between the speakers 40/CPU 50, CE device 12, and server 60, with the CE device 12 and/or server 60 being thus able to address individual speakers, in some examples through the CPU 50 and/or through the DSP 46 and/or through individual processing units associated with each individual speaker assembly 40, as may be mounted integrally in the same housing as each individual speaker assembly 40.

The CE device 12 and/or control device 52 of each individual speaker train (speaker+amplifier+DAC+DSP, for instance) may communicate over wired and/or wireless links with the Internet 22 and through the Internet 22 with one or more network servers 60. Only a single server 60 is shown in FIG. 1. A server 60 may include at least one processor 62, at least one tangible computer readable storage medium 64 such as disk-based or solid state storage, and at least one network interface 66 that, under control of the processor 62, allows for communication with the other devices of FIG. 1 over the network 22, and indeed may facilitate communication between servers and client devices in accordance with present principles. Note that the network interface 66 may be, e.g., a wired or wireless modem or router, Wi-Fi transceiver. Li-Fi transceiver, or other appropriate interface such as, e.g., a wireless telephony transceiver.

Accordingly, in some embodiments the server 60 may be an Internet server, may include and perform "cloud" functions such that the devices of the system 10 may access a "cloud" environment via the server 60 in example embodiments. In a specific example, the server 60 downloads a software application to the master and/or the CE device 12 for control of the speakers 40 according to logic below. The master/CE device 12 in turn can receive certain information from the speakers 40, such as their location from a real time location system (RTLS) such as but not limited to GPS or Li-Fi, and/or the master/CE device 12 can receive input from the user, e.g., indicating the locations of the speakers 40 as further disclosed below. Based on these inputs at least in part, the master/CE device 12 may execute the speaker optimization logic discussed below, or it may upload the inputs to a cloud server 60 for processing of the optimization algorithms and return of optimization outputs to the CE device 12 for presentation thereof on the CE device 12, and/or the cloud server 60 may establish speaker configurations automatically by directly communicating with the speakers 40 via their respective addresses, in some cases through the CE device 12. Note that if desired, each speaker assembly 40 may include one or more respective one or more light emitting diode (LED) assemblies 68 implementing Li-Fi communication to establish short-range wireless communication among the networked speakers shown. Also, the remote control of the user, e.g., the CE device 12, may include one or more LED assemblies. Additional LED assemblies 68 for the various purposes described herein may be mounted in and around an enclosure 70 as shown. An LED assembly 68 may include both LEDs and light receivers such as photodiodes, along with appropriate control circuitry.

As shown, the speaker assemblies 40 may be disposed in the enclosure 70 such as a room, e.g., a living room. For purposes of disclosure, the enclosure 70 has (with respect to the example orientation of the speakers shown in FIG. 1) a front wall 72, left and right-side walls 74, 76, and a rear wall 78. One or more listeners 82 may occupy the enclosure 70 to listen to audio from the speakers 40. One or microphones 80 may be arranged in the enclosure for generating signals representative of sound in the enclosure 70, sending those signals via wired and/or wireless links to the CPU 50 and/or the CE device 12 and/or the server 60. In the non-limiting example shown, each speaker assembly 40 supports a microphone 80, it being understood that the one or more microphones may be arranged elsewhere in the system if desired.

Disclosure below may make determinations using sonic wave calculations known in the art, in Which the acoustic waves frequencies (and their harmonics) from each speaker, given its role as a bass speaker, a treble speaker, a subwoofer speaker, or other speaker characterized by having assigned to it a particular frequency band, are computationally modeled in the enclosure 70 and the locations of constructive and destructive wave interference determined based on where the speaker is and where the walls 72-78 are. As mentioned Above, the computations may be executed, e.g., by the CE device 12 and/or by the cloud server 60 and/or master control device 52.

As an example, a speaker may emit a band of frequencies between 20 Hz and 30 Hz, and frequencies (with their harmonics) of 20 Hz, 25 Hz, and 30 Hz may be modeled to propagate in the enclosure 70 with constructive and destructive interference locations noted and recorded. The wave interference patterns of other speakers based on the modeled expected frequency assignations and the locations in the enclosure 70 of those other speakers may be similarly computationally modeled together to render an acoustic model for a particular speaker system physical layout in the enclosure 70 with a particular speaker frequency assignation. In some embodiments, reflection of sound waves from one or more of the walls may be accounted for in determining wave interference. In other embodiments reflection of sound waves from one or more of the walls may not be accounted for in determining wave interference. The acoustic model based on wave interference computations may furthermore account for particular speaker parameters such as but not limited to equalization (EQ). The parameters may also include delays, i.e., sound track delays between speakers, which result in respective wave propagation delays relative to the waves from other speakers, which delays may also be accounted for in the modeling. A sound track delay refers to the temporal delay between emitting, using respective speakers, parallel parts of the same soundtrack, which temporally shifts the waveform pattern of the corresponding speaker. The parameters can also include volume, which defines the amplitude of the waves from a particular speaker and thus the magnitude of constructive and destructive interferences in the waveform. Collectively, a combination of speaker location, frequency assignment, and parameters may be considered to be a "configuration". A configuration may be established to optimize, according to a desired, potentially empirically-determined standard of optimization, acoustic wave constructive and destructive interference for a particular location in the enclosure 70 given the locations of the walls and the various frequencies to be assigned to the various speakers. The particular location(s) may be the expected or actual location of one or more listener, and the EQs, frequency assignations, and delays of the various speakers may be further tailored to the desires or traits of specific individual listeners based on listener profiles.

Figure 2:
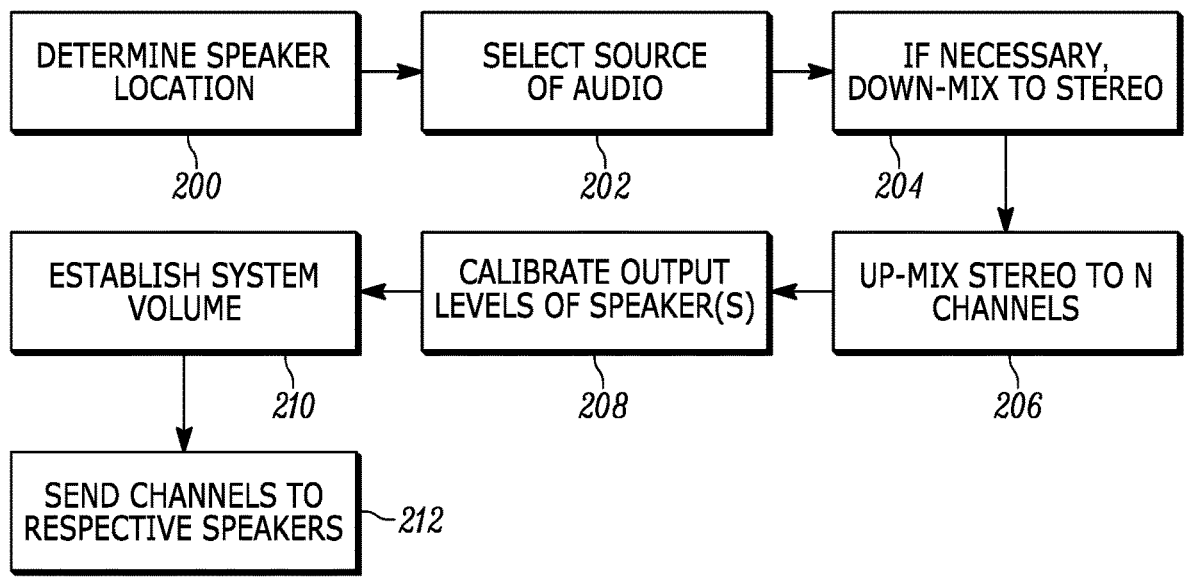
FIG. 2 is a flow chart of example overall logic pertaining to the centralized system in FIG. 1.

The configuration shown in FIG. 1 has a centralized control architecture in which the master device 52 or CE device 12 or other device functioning as a master renders two channel audio into as many channels are there are speakers in the system, providing each respective speaker with its channel. The rendering, which produces more channels than stereo and hence may be considered "up-mixing", may be executed using principles described in the above-referenced rendering references. FIG. 2 describes the overall logic flow that may be implemented using the centralized architecture of FIG. 1, in which most if not all of the logic is executed by the master device.

The logic shown in FIG. 2 may be executed by one or more of the CPU 50, the CE device 12 processor 24, speaker assembly processor such as a DSP 46, and the server 60 processor 62. The logic may be executed at application boot time when a user, e.g. by means of the CE device 12, launches a control application, which prompts the user to energize the speaker system to energize the speaker assemblies 40.

Commencing at block 200, the processor(s) of the master determines room dimension, the location of each speaker in the system, and number of speakers in the room, and the location and if desired identities of each listener in the room. This process is described further below. Moving to block 202, the master selects the source of audio to be played. This may be done responsive to user command input using, e.g., the device 12.

If the input audio is not a two-channel stereo, but instead is, e.g., seven channel audio plus a subwoofer channel (denoted "7.1 audio"), at block 204 the input audio may be down-mixed to stereo (two channel). The down-mixing may be executed using principles described in the above-referenced rendering references. Other standards for down-mixing may be used, e.g., ITU-R BS.775-3 or Recommendation 7785. Then, proceeding to block 206 the stereo audio (whether received in stereo or down-mixed) can be up-mixed to render "N" channels, where "N" is the number of speakers in the system. Audio can be rendered for each speaker channel based on the respective speaker location (i.e., perimeter, aerial, sub in the x, y, z domain). The up-mixing can be based on the current speaker locations as will be explained further shortly.

Moving to block 208, the channel/speaker output levels are calibrated per description below, preferably based on primary listener location, and then at block 210 system volume is established based on, e.g., room dimensions, number and location of speakers, etc. The user may adjust this volume. At block 212 the master sends the respective audio channels to the respective speakers.

Thus, it may now be appreciated that the speakers 40 do not have to be in a predefined configuration to support a specific audio configuration such as 5.1 or 7.1 and do not have to be disposed in the pre-defined locations of such audio configurations, because the input audio is down-mixed to stereo and then up-mixed into the appropriate number of channels for the actual locations and number of speakers.

Note that in some embodiments the master device 52 sends the same stereo audio to all speaker assemblies, with each individual speaker assembly up-mixing the stereo to N-channel audio (N being an integer greater than two d then selecting for play only the channel in the N-channel audio assigned to that speaker assembly. This is discussed in greater detail with reference to FIG. 9 below.

Figure 3:
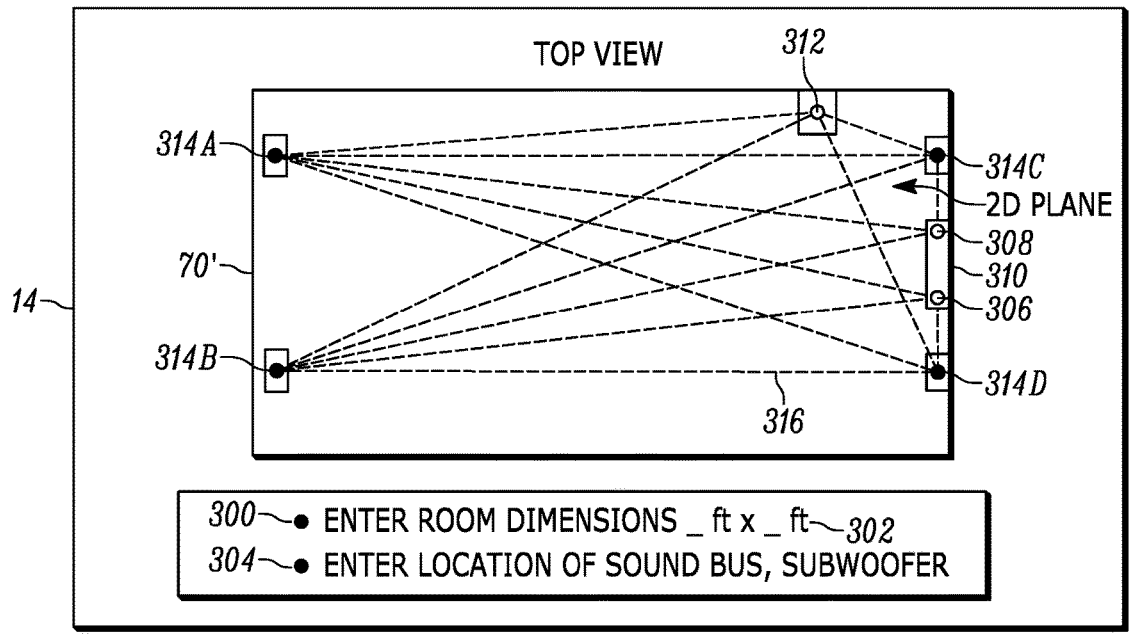
FIG. 3 is a screen shot of an example user interface (UI) that may be presented on a consumer electronics (CE) device to set up speaker location determination.

FIG. 3 illustrates an embodiment in which the dimensions of the enclosure 70 are manually entered by the user, it being understood that automatic means of effecting the same outcome are set forth further below.

Figure 4:
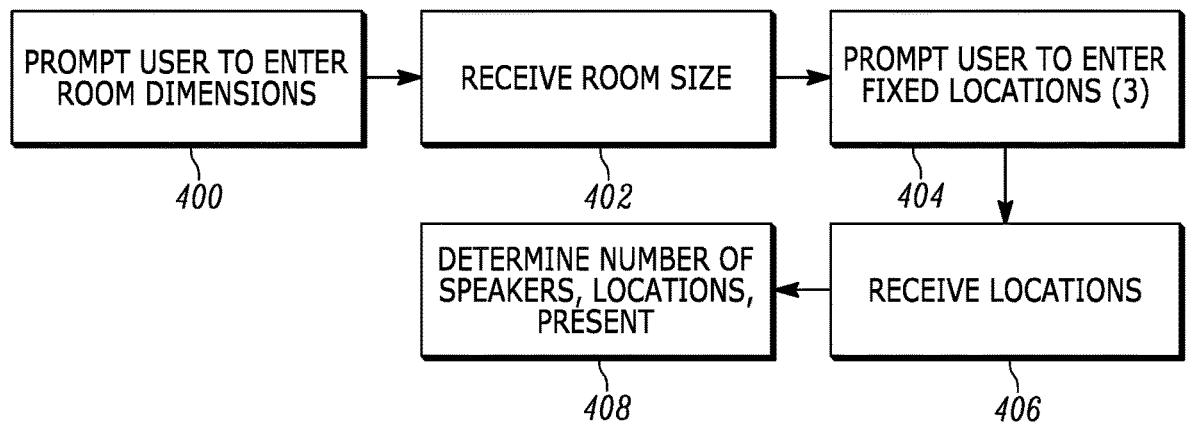
FIG. 4 is a flow chart of example logic for determining speaker locations in a room.

A user interface (UI) may be presented, e.g., on the display 14 of the CE device 12, pursuant to the logic in block 200 of FIG. 2, in the case in which speaker location determination is intended for two dimensions only (in the x-y, or horizontal, plane). FIG. 4 illustrates aspects of logic that may be used with FIG. 3. An application (e.g., via Android, iOS, or URL) can be provided to the customer for use on the CE device 12.

As shown at 300 in FIG. 3 and at block 400 in FIG. 4, the user can be prompted to enter the dimensions of the room 70, an outline 70' of which may be presented on the CE device as shown once the user has entered the dimensions. The dimensions may be entered alpha-numerically, e.g., "15 feet by 20 feet" as at 302 in FIG. 3 and/or by dragging and dropping the lines of an initial outline 70' to conform to the size and shape of the room 70. The application presenting the UI of FIG. 3 may provide a reference origin, e.g., the southwest corner of the room. The room size is received from the user input at block 402 of FIG. 4.

In other embodiments discussed further below, room size and shape can be determined automatically. This can be done by sending measurement waves (such as Li-Fi transmissions from the LEDs) from an appropriate transceiver on the CE device 12 and detecting returned reflections from the walls of the room 70, determining the distances between transmitted and received waves to be one half the time between transmission and reception times the speed of the relevant wave. Or, it may be executed using other principles such as imaging the walls and then using image recognition principles to convert the images into an electronic map of the room.

Moving to block 404, the user may be prompted as at 304 to enter onto the UI of FIG. 3 at least three fixed locations, in one example, the left and right ends 306, 308 of a sound bar or TV 310 and the location at which the user has disposed the audio system subwoofer 312. Four fixed locations are entered for 3D rendering determinations. Entry may be effected by touching the display 14 at the locations in the outline 70' corresponding to the requested components. In implementation, each fixed location may be associated with a respective Li-Fi LED 68 shown in FIG. 1 and discussed further below. The locations are received at block 406 in FIG. 4. The user may also directly input the fact that, for instance, the sound bar is against a wall, so that rendering calculations can ignore mathematically possible calculations in the region behind the wall.

Note that only speakers determined to be in the same room may be considered. Other speakers in other rooms can be ignored. When determining the speaker locations, it may first be decided if a 2D or 3D approach is to be used. This may be done by knowing how many known of fixed locations have been entered. Three known locations yield a 2D approach (all speakers are more or less residing in a single plane). Four known locations yield a 3D approach. Note further that the distance between the two fixed sound bar (or TV) locations may be known by the manufacturer and input to the processor automatically as soon as the user indicated a single location for the sound bar. In some embodiments, the subwoofer location can be input by the user by entering the distance from the sound bar to the subwoofer. Moreover, if a TV is used for two of the fixed locations, the TV may have two locators mounted on it with a predetermined distance between the locators stored in memory, similar to the sound bar. Yet again, standalone location markers such as LEDs or UWB tags can be placed within the room (e.g., at the corner of room, room boundary, and/or listening position) and the distance from each standalone marker to the master entered into the processor.

When Li-Fi communication is established among the speakers in the room 70, at block 408 in FIG. 4 the master device and/or CE device 12 and/or other device implements a location module according to the location determination references above, determining the number of speakers in the room 70 and their locations, and if desired presenting the speakers at the determined locations (along with the sound bar 310 and subwoofer 213) as shown at 314A-D in FIG. 3. The lines 316 shown in FIG. 3 illustrate communication among the speakers 310, 312, 314 and may or may not be presented in the UI of FIG. 3.

In an example "automatic" implementation discussed in greater detail below, a component in the system such as the master device or CE device 12 originates two-way Li-Fi ranging with the Li-Fi LEDs 68 of the fixed locations described above. Using the results of the ranging, range and direction to each speaker from the originating device are determined using triangulation and the distance-time-speed algorithm described Above. If desired, multiple rounds of two-way ranging can be performed with the results averaged for greater accuracy.

The two-way ranging described above may be affected by causing the CE device 12 (or other device acting as a master for purposes of speaker location determination) to receive a poll message from an anchor point. The CE device 12 sends a response message to the poll message. These messages can convey the identifications associated with each LED 68 or transmitter. In this way, the number of speakers can be known.

The polling anchor point may wait a predetermined period known to the CE device 12 and then send a final poll message to the CE device 12, which can then, knowing the predetermined period from receipt of its response message that the anchor point waited and the speed of the Li-Fi signals, and the time the final message was received, determine the range to the anchor point.

While FIGS. 3 and 4 are directed to finding the locations of the speakers in two dimensions, their heights (elevations) in the room 70 may also be determined for a three-dimensional location output. The height of each speaker can be manually input by the user or determined using an altimeter associated with each speaker or determined by implementing a LED 68, e.g., the CE device 12 as three integrated circuits with respective LEDs distanced from each other by known distances, enabling triangulation in three dimensions.

The primary listener location may be then determined according to discussion below. The number of speakers and their locations in the room are now known. Any speakers detected as above that lie outside the room may be ignored. A GUI may be presented on the CE device of the user showing the room and speakers therein and prompting the user to confirm the correctness of the determined locations and room dimensions.

Figure 5:
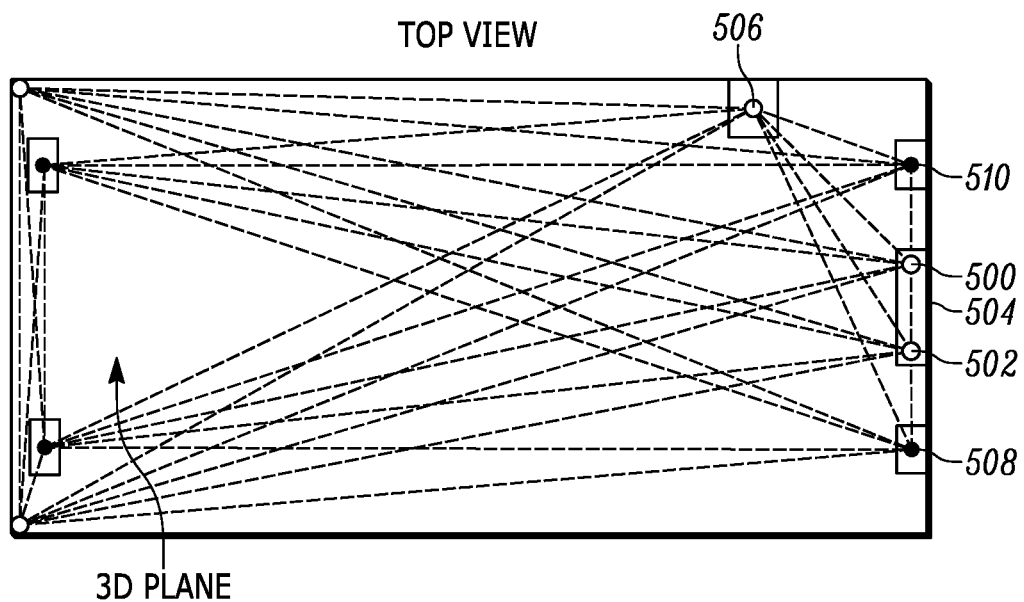
FIGS. 5-7 are additional screen shots of example UIs related to speaker location determination.
Figure 6:
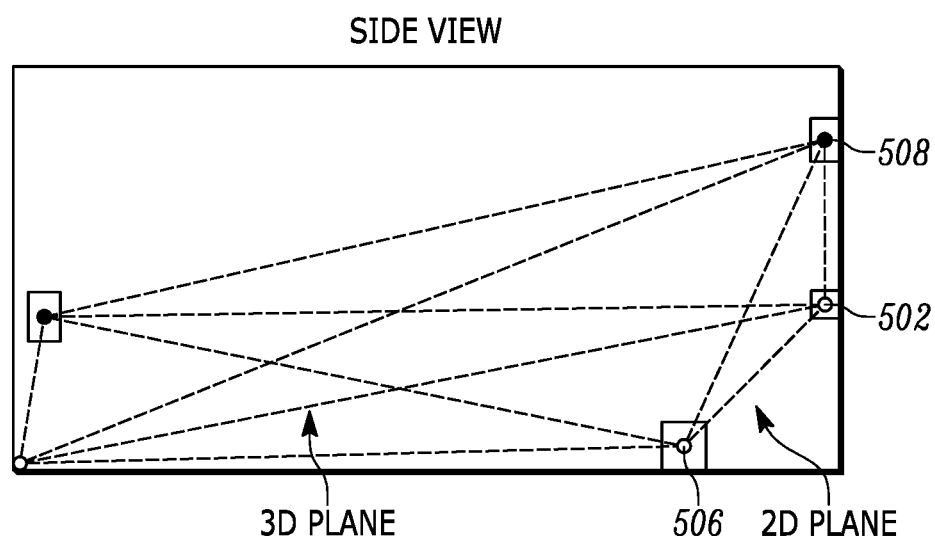

FIGS. 5 and 6 illustrate aspects of an implementation of the 3D location determination. These figures may be presented as UIs on the CE device 12. Four known locations are provided to determine the location of each speaker in three dimensions. In the example shown in FIG. 5, the user has input the locations 500, 502 associated with a sound bar/TV 504 and the location of the subwoofer 506. The user has also identified (e.g., by touching the display 14 of the CE device 12 at the appropriate locations) two corners 508, 510 of the room 70, preferably corners in which locators such as LEDs 68 have been positioned. Determination of the number of speakers and locations in 3D using triangulation discussed above and the techniques described in the above-referenced location determination references is then made. Note that while FIGS. 5 and 6 respectively show a top view and a side view of the room 70 on the display 14 in two separate images, a single 3D image composite may be presented.

Figure 7:
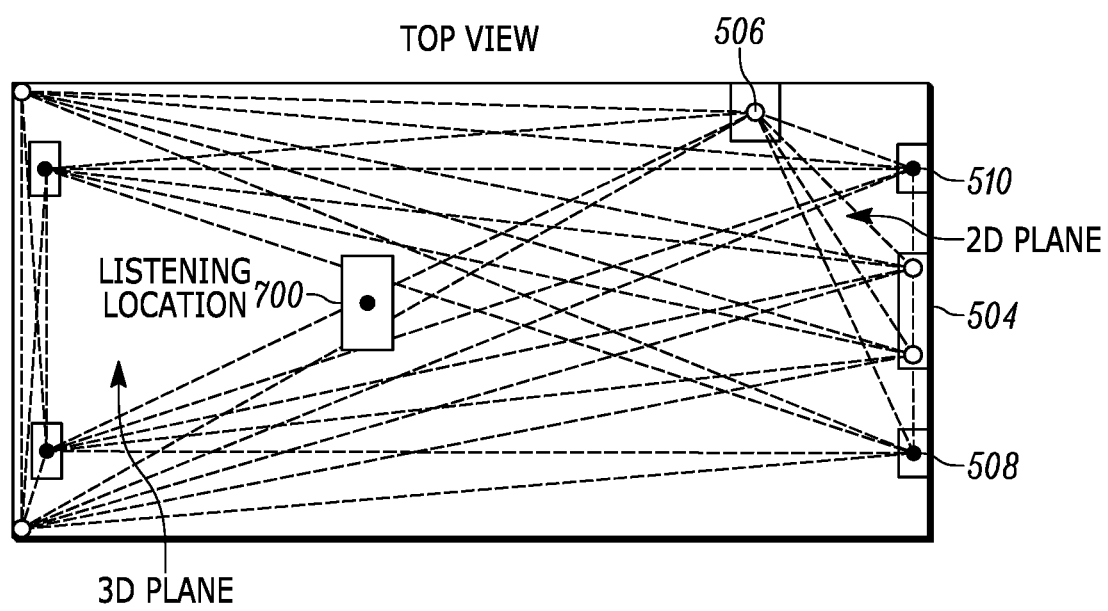

FIG. 7 illustrates yet another UI that can be presented on the CE device 12 in which the user has entered, at 700, the expected location of a listener in the room 700. Or, the location 700 can be automatically determined as described in U.S. Pat. No. 9,854,362, incorporated herein by reference using Li-Fi transmissions. Yet again, for purposes of up-mixing according to the rendering references incorporated above, a default location may be assumed, e.g., the geometric center of the room 70, or alternatively about ⅔ of the distance from the front of the room (where the sound bar or TV is usually located) to the rear of the room.

Once the number and locations of the speakers are known, the up mixing at block 206 may be executed using the principles discussed in the above-referenced rendering documents. Specifically, the stereo audio (either as received stereo or resulting from down-mixing of non-stereo input audio at block 204) is up-mixed to, as an example, N.M audio, wherein M=number of subwoofers (typically one) and N=number of speakers other than the sub-woofer. As detailed in the rendering documents, the up-mixing uses the speaker locations in the room 70 to determine which of the "N" channels to assign to each of the respective N speakers, with the subwoofer channel being always assigned to the subwoofer. The listener location 700 shown in FIG. 7 can be used to further refine channel delay, EQ, and volume based on the speaker characteristics (parameters) to optimize the sound for the listener location.

One or more measurement microphones, such as may be established by the microphones 80 in FIG. 1, may be used if available to further calibrate the channel characteristics. This may be made based on information received from the individual speakers/CPU 50 indicating microphones are on the speakers, for example.

If measurement microphones are available, the user can be guided through a measurement routine. In one example, the user is guided to cause each individual speaker in the system to emit a test sound ("chirp") that the microphones 80 and/or microphone 18 of the CE device 12 detect and provide representative signals thereof to the processor or processors executing the logic, which, based on the test chirps, can adjust speaker parameters such as EQ, delays, and volume.

The example above uses a centralized master device to up-mix and render each of the "N" audio channels, sending those channels to the respective speakers. When wireless connections are used, and bandwidth is limited, a distributed architecture may be used, in which the same stereo audio from a master is sent to each speaker, and each speaker renders, from the stereo audio, its own respective channel. Details of this alternative architecture are set forth in the above-referenced U.S. patent application Ser. No. 15/019,111.

Figure 8:
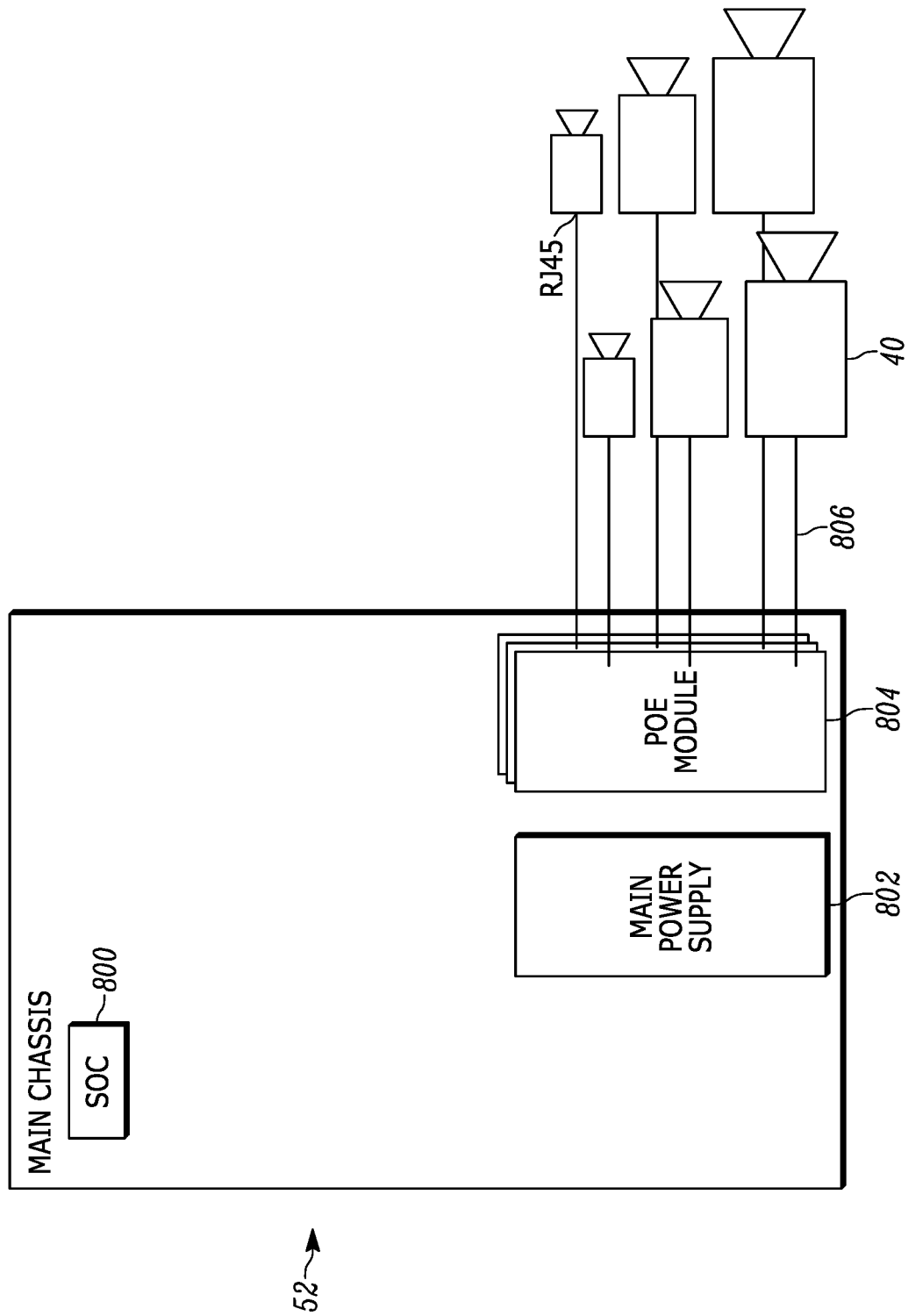
FIG. 8 is a block diagram of an example power over Ethernet (PoE) system.

FIG. 8 illustrates an example control device 52, also referred to herein as a "master" or "master device". As shown, the control device 52 may include a system on a chip (SoC) 800 that can include one or more processors and one or more storage devices. Audio data is processed, and speaker assemblies are controlled by the SoC. One or more power supplies 802 may be incorporated in the control device and may communicate electrical power through one or more power over Ethernet (PoE) modules 804, in some cases one PoE module communicating power from the power supply 802 and audio data, e.g., in the form of packets, to a respective speaker assembly 40 via a respective Ethernet cable 806 on a one-to-one basis.

Figure 9:
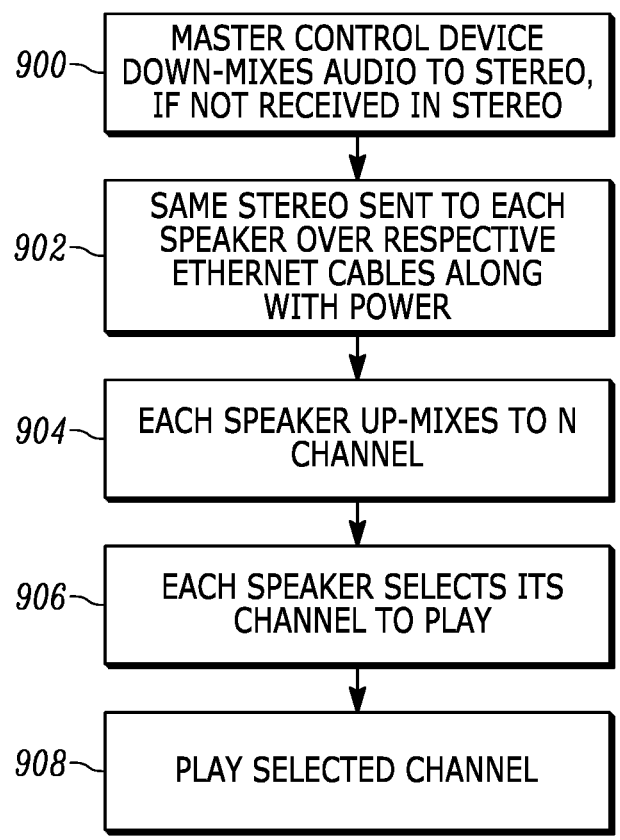
FIG. 9 is a flow chart of a distributed technique in which each speaker assembly derives its own channel to play.

FIG. 9 illustrates a distributed embodiment in which at block 900 the control device 52 either receives audio in stereo or, if received as N-channel audio (N>2), down-mixes the audio to stereo. At block 902 the same stereo is sent to each speaker assembly 40 over its respective Ethernet cable, along with power from the control device 52. At block 904 each speaker assembly up-mixes the stereo to N-channel audio and at block 906 selects its channel from among the N channels to play at block 908.

Selection at block 906 may be in accordance with control signals received from the control device over the Ethernet cable linking the speaker assembly to the control device. Principles above explain example techniques for selecting which speaker assembly plays which channel. Note that each speaker assembly, when connected to the control device by an Ethernet cable, can supplement principles above by sending to the control device via Ethernet speaker model and ID number, frequency range, and speaker position or location (e.g., as indicated by GPS). The control device can then communicate back to each speaker assembly via its Ethernet cable whether the speaker should place itself in calibration mode, a system name and hence channel selection indication for that speaker (e.g., left front or right rear), and synchronization information.

Figure 10:
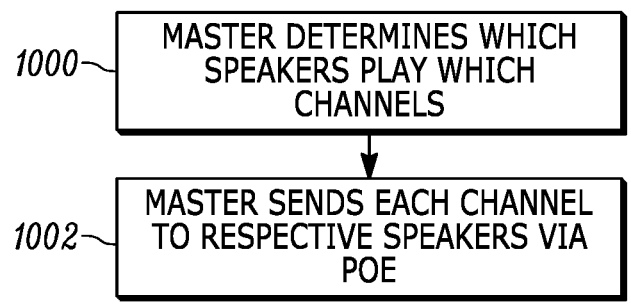
FIG. 10 is a flow chart of a centralized technique in which the master sends the appropriate channel of N-channel audio to respective speakers.

FIG. 10, in contrast, illustrates a centralized embodiment in which the control device 52 ("master") determines, at block 1000, which speakers are to play which audio tracks of the N-channel audio, according to disclosure above. Typically, N is greater than two, and may be five, seven, or thirteen in non-limiting examples (e.g., 5.1 audio, 13.2 audio, etc.) Proceeding to block 1002, the master sends each respective channel (and only the respective channel) of the N-channel audio to the respective speaker determined at block 1000 to play that channel. The audio may be sent over respective PoE cables.

Figure 11:
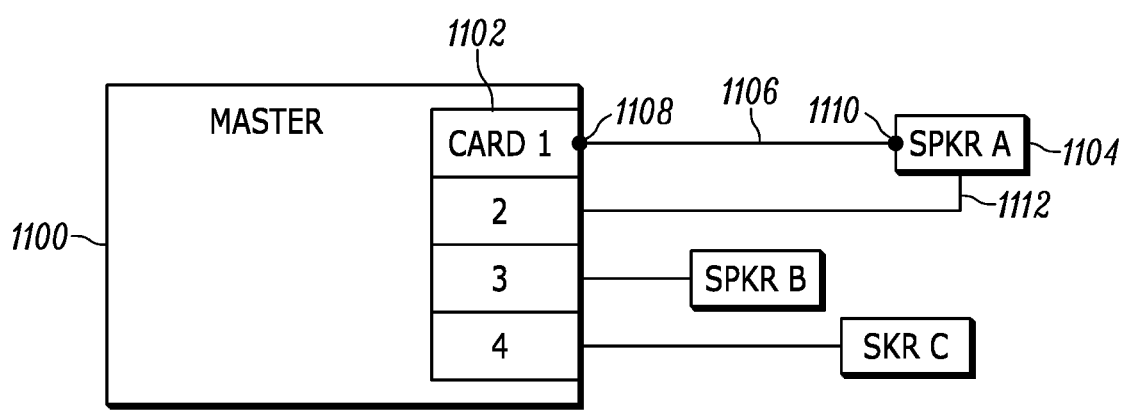
FIG. 11 is a block diagram of a first example PoE implementation.

FIG. 11 illustrates an embodiment with a control device ("master") 1100 that is substantially identical in configuration and operation to the preceding devices with the following exceptions. The master 1100 in FIG. 11 includes four PoE cards or circuit boards 1102. The first PoE card 1102 ("card 1" in FIG. 11) is connected to a first speaker 1104 ("speaker A" in FIG. 11) by a first PoE cable 1106. The PoE cable 1106 typically includes four twisted pairs and is connected to the first PoE card 1102 at an RJ45 terminal 1108 and to the first speaker 1104 at a complementary speaker RJ45 port 1110.

In the example shown in FIG. 11, a second PoE card ("card 2") also is connected to the first speaker ("speaker A") via a second PoE cable 1112, in this example, the first speaker A may be a relatively large speaker requiring high power that may in turn require more than a single PoE card 1102 to supply the power. PoE cards "3" and "4" supply power (and in some cases audio as well) to respective speakers "B" and "C" through respective PoE cables.

Figure 12:
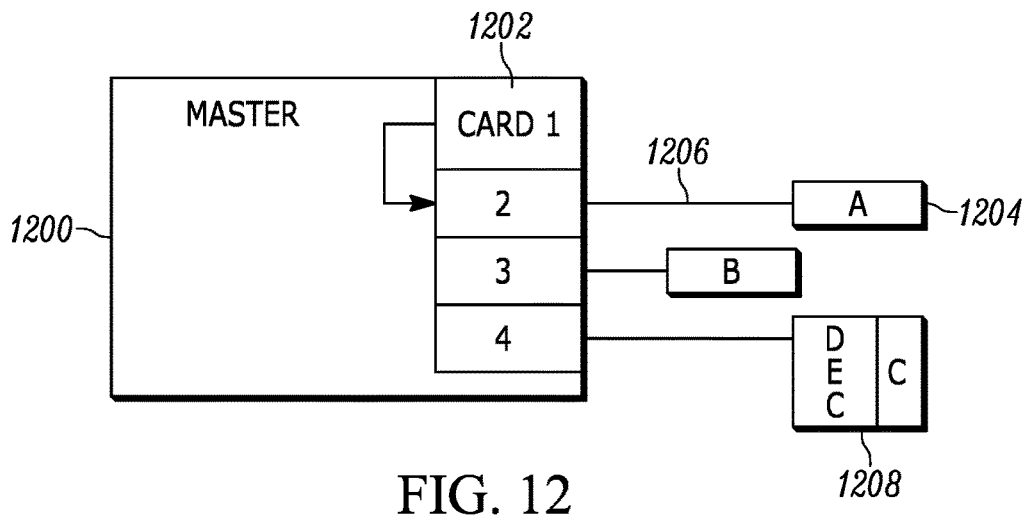
FIG. 12 is a block diagram of a second example PoE implementation.

FIG. 12 illustrates an alternate technique for ganging PoE cards. In FIG. 12, a master 1200 includes four PoE cards or circuit boards 1202, with power from a first PoE card "1" being supplied to a second PoE card "2" and with the second PoE card "2" being connected to a first speaker 1204 (speaker "A") via one and only one PoE cable 1206. Thus, power from both PoE cards "1" and "2" can be conveyed to the first speaker "A" over the cable 1206. PoE cards "3" and "4" supply power (and in some cases audio as well) to respective speakers "B" and "C" through respective PoE cables. Incidentally, FIG. 12 also shows that any of the speakers herein may include one or more audio decoders 1208.

Figure 13:
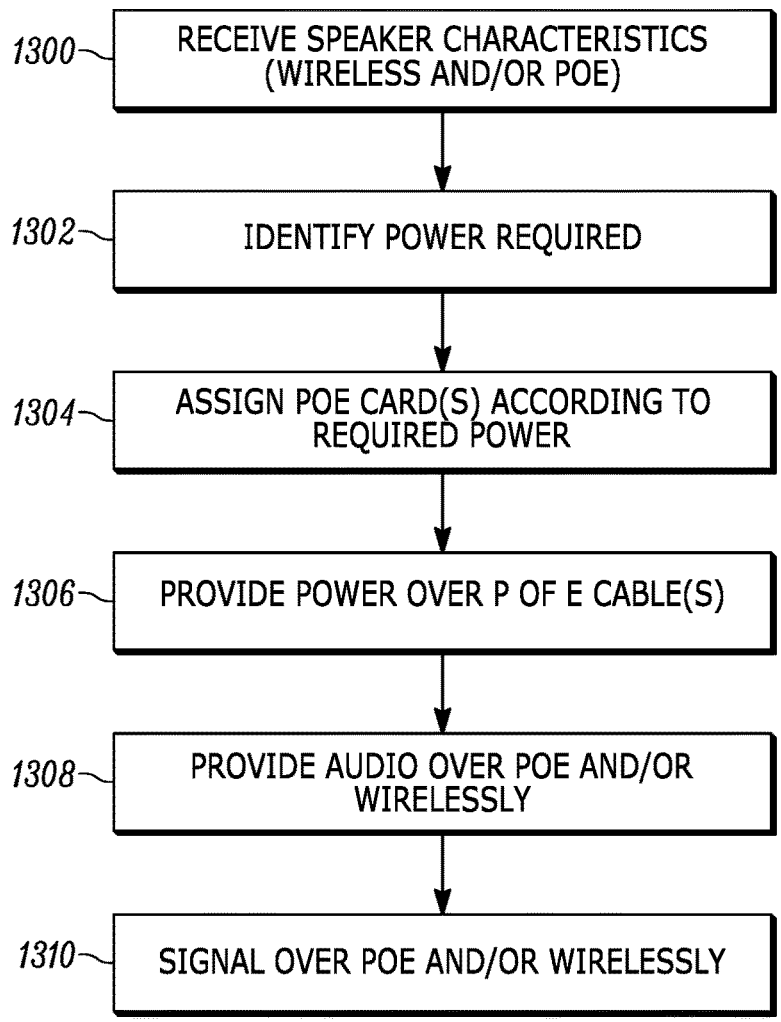
FIG. 13 is a flow chart of example logic for providing power and audio to speakers using PoE principles at least in part.

FIG. 13 illustrates example logic for some implementations. Commencing at block 1300, any of the master devices shown and described herein may receive from the speakers in the system data including speaker characteristics. These characteristics may include speaker model and ID number, frequency range, and speaker position or location (e.g., as indicated by GPS). The master can then communicate back to each speaker assembly via its PoE cable whether the speaker should place itself in calibration mode, a system name and hence channel selection indication for that speaker (e.g., left front or right rear), and synchronization information. The communication of this information may be via PoE cables, or via wireless transceivers, or a combination thereof.

Using the speaker characteristics received at block 1300, at block 1302 the master can identify the power required by each speaker. This may be done by entering a database correlating model/serial numbers of speakers to power, or frequency ranges of speakers to power, etc.

Proceeding to block 1304, PoE cards such as in any of the architectures described herein may be assigned to speakers according to the required power identified at block 1302. Thus, for example, the master can indicate on a user interface to an installation technician which PoE card(s) to connect via PoE cables to which speaker(s). For example, in the case of the architecture of FIG. 11, the master may indicate to connect, via two respective PoE cables, PoE cards "1" and "2" to speaker "A" and then to connect cards "3" and "4" to speakers "B" and "C", respectively. In the case of FIG. 12, the master may indicate to connect, via a single PoE cable, PoE card "1" (Which is ganged to card "2" to receive power therefrom) to speaker "A" and then to connect cards "3" and "4" to speakers "B" and "C", respectively.

Furthermore, one or more wires among the four twisted pair in a PoE cable may be re-purposed according to the power determination at block 1302 to provide more or less power to a particular speaker. For example, for a lower power speaker, the twisted pair data and power assignments may remain unchanged from a standard assignment such as may be provided in IEEE 802.3, while for a speaker requiring high power, one or more of the data assignments may be converted to power and power sent over that wire or wire among the twisted pairs of a particular cable, instead of audio data.

Moving to block 1306, the master provides power to energize the respective speakers over the respective PoE cables. At block 1308 audio is provided by the master to the speakers in accordance with either the distributed or centralized architectures described above. The audio may be provided via the PoE cables, or wirelessly, leaving the PoE cables to carry only power when power capacity looms as a large requirement. A combination of both PoE transmission of some audio data and wireless transmission of other audio data may be used.

Likewise, at block 1310 non-audio signaling data may be exchanged between the master and speakers via PoE cables, wirelessly, or a combination thereof.

Figure 14:
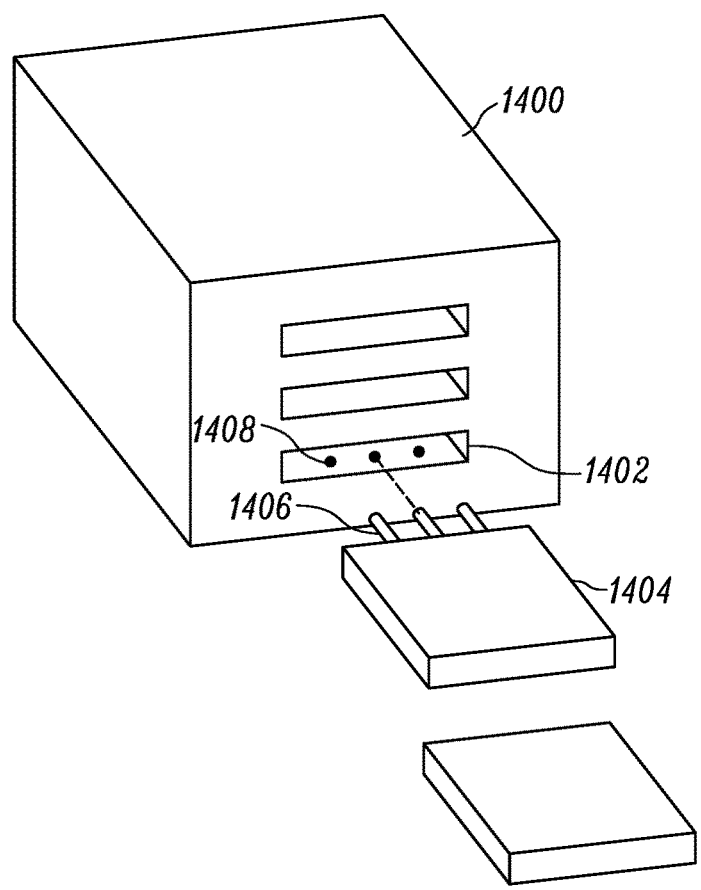
FIG. 14 is a schematic diagram of an example audio box in which various modules implemented as circuit cards can be plugged into sockets in the box as desired to tailor the box for desired functionality.

FIG. 14 illustrates an example audio box with a hollow housing 1400 that may be made of plastic or ceramic or lightweight metal and that may be parallelepiped-shaped as shown. The housing 1400 includes plural receptacles 1402 (which may have external openings as shown or which may be entirely enclosed within the housing 1400) for receiving respective modules 1404 embodied as circuit cards in the example of FIG. 14. The circuit cards 1404 may include connectors 1406 such as pins that engage complementary connectors 1408 such as sockets in the receptacles 1402 to establish electrical communication between the modules and other components within the housing 1400, typically through internal electrical buses.

Figure 15:
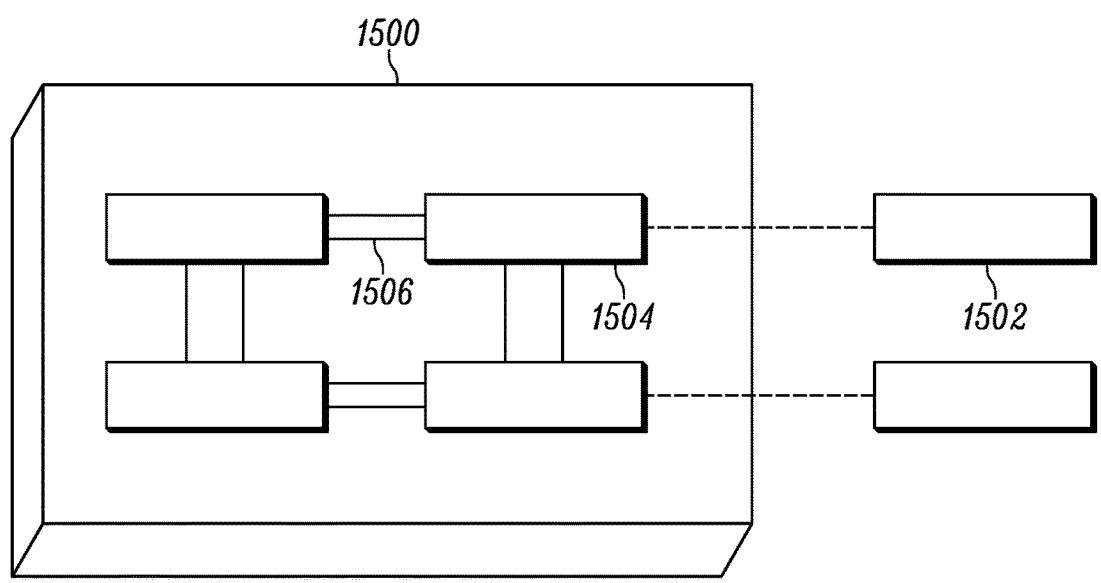
FIG. 15 is a schematic diagram of an example audio box in which various modules implemented as semiconductor chips can be engaged in the box using, for example, die fabric or data buses as desired to tailor the box for desired functionality.

FIG. 15 illustrates and alternate audio box with a housing 1500 for engaging multiple modules 1502 implemented as computer chips that are disposed in regions 1504 of the audio box. The chips communicate via electrical boxes 1506 and/or fabric within a die supporting the chips.

In yet other embodiments, the modules described herein may be implemented by software.

As described further herein, the audio boxes are capable of having multiple configurations that are determined by customer needs. Configurations are made by adding the appropriate modules 1404/1502.

Figure 16:
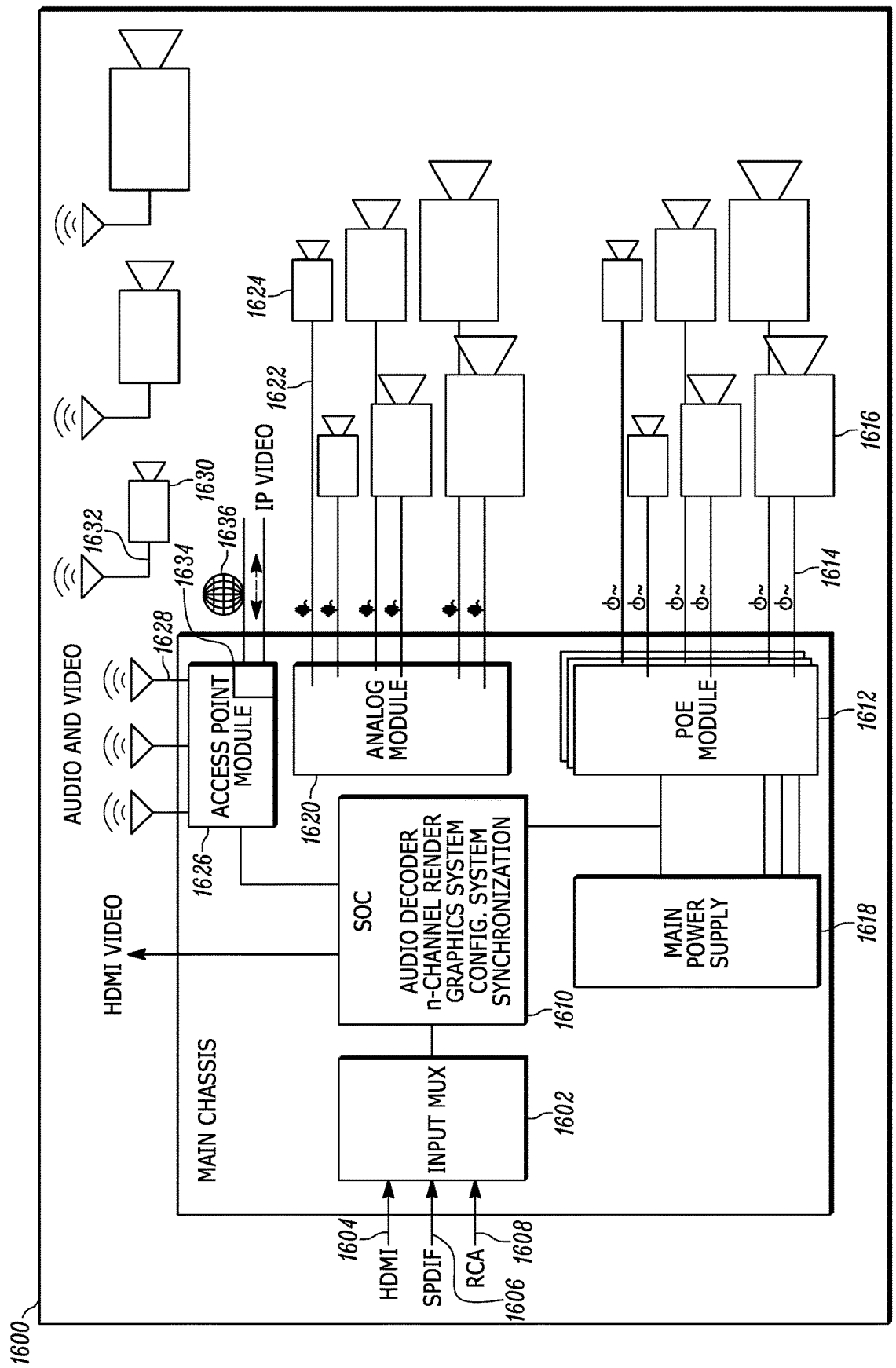
FIG. 16 is a block diagram of example internal modules of an audio box.

FIG. 16 illustrates example internal components of an audio box 1600 that may include an input multiplexer 1602 for receiving audio from multiple sources. For example, the multiplexer 1602 may include an input port 1604 (such as but not limited to a jack) for receiving data formatted in high definition multimedia interface (HDMI). The multiplexer 1602 may also include an input 1606 configured to receive Sony-Philips digital interface (SPDIF) audio, and an input 1608 configured to receive analog audio such as Radio Corporation of America (RCA) audio. Other inputs for other formats may be provided.

The audio received at the multiplexer 1602 may be sent to a system on a chip (SoC) 1610 with one or more processors and necessary audio encoders and decoders for decoding audio streams such as Dolby streams, digital theater systems (DTS) streams, and Auro streams. The SoC may include a graphics processor for adding graphics for a menu overlay.

The SoC 1610 may also perform n-channel rendering as described above, identifying the number of speakers in a given system and configuring them automatically according to example principles above. This can include determining whether a centralized scheme or distributed scheme should be used according to preceding principles. In a distributed system, as described above each speaker receives the same audio data and the final rendering is done within each speaker according to its speaker position. On the other hand, in a centralized system, each speaker receives specific audio data for that specific speaker position.

When a speaker is connected to the audio box, it can communicate specific information to the SoC 1610 using principles described above, such as speaker model and unique speaker ID, the frequency range of the speaker, and the geographic or other position/orientation of the speaker. In turn, the SoC 1610 can communicate system information to each speaker, such as calibration mode, a calculated speaker position, and an audio box-assigned speaker name.

Additionally, the SoC can execute system synchronization between PoE speakers, wireless speakers, and analog speakers so that all speakers in the system are synchronized with each other. The SoC can also execute computer applications downloaded through the below-described network module and provided by the manufacturer of the audio box and third parties.

As shown in FIG. 16, the audio box 1600 may include one or more PoE modules 1612 which communicate power and audio data over Ethernet lines 1614 to one or more speakers 1616. The power may be provided to the modules 1612 by a power supply 1618, which may also provide power to the other components in the audio box 1600. As described above, each PoE module 1612 delivers enough power for one or more speakers 1616 to function, with the Ethernet lines 1614 (which may be implemented by electrical cables) delivering digital audio data to each speaker 1616.

One or more analog audio modules (AAM) 1620 may be provided in the audio box 1600. The AAM 1620 can deliver, via electrical lines 1622, analog audio data to one or more analog speakers 1624 in the system.

Furthermore, one or more access point (AP) modules 1626 may be provided in the audio box 1600 for two-way wireless communication, using one or more transceiver/antennas 16213, with one or more wireless speakers 1630, each of which also has at least one respective wireless transceiver/antenna 1632. The two-way wireless communication may be for purposes described previously.

Additionally, the AP module 1626 may include one or more wireless network interfaces 1634 such as a wireless telephony transceiver and/or Wi-Fi transceiver that can connect to a home network for wireless reception of Internet Protocol (IP) video and/or audio and that can also connect to a wide area network 1636 such as the Internet for the same purpose. The AP module 1626 may establish its own speaker network specifically for communicating audio data to the wireless speakers 1630 and for receiving information from the wireless speakers 1630.

Figure 17:
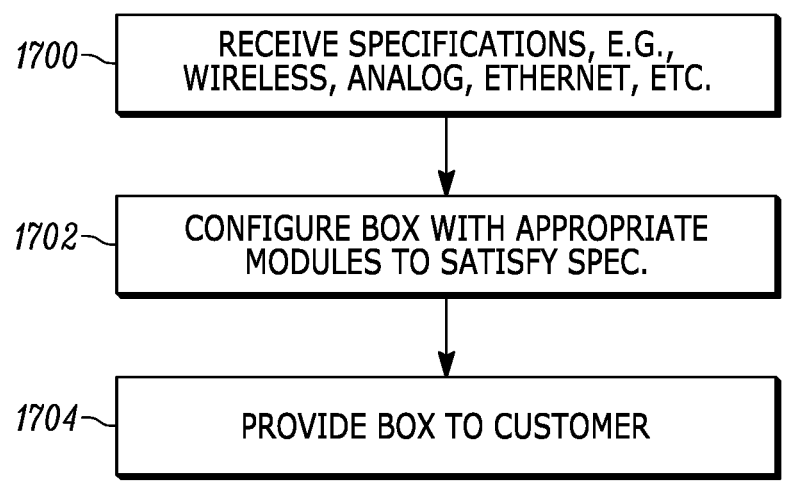
FIG. 17 is a flow chart of example logic for configuring an audio box.

FIG. 17 illustrates example logic consistent with FIGS. 14-16. Commencing at block 1700, a system configuration is received that specifies, among other things, the types of speakers to be included in an audio network, as may be demanded by an end customer. For example, the specification may indicate that the speakers include wireless speakers, Ethernet speakers, analog speakers, and combinations thereof.

Moving to block 1702, the audio box, e.g., any of the audio boxes described in FIGS. 14-16, are configured with the appropriate modules to satisfy the specification received at block 1700. The configured audio box is then provided to the end customer at block 1704 in fulfillment of the specification received at block 1700. Thus, different specifications can result in different configurations of different audio boxes.

While particular inventive techniques are herein shown and described in detail, it is to be understood that the subject matter which is encompassed by the present invention is limited only by the claims.

What is claimed is:

1. An assembly comprising:
   at least one housing;
   at least one network interface in the housing configured to exchange data with a wide area network;
   the housing comprising plural regions for configuring the assembly with plural modules; and plural modules engaged with respective regions in the housing, the modules comprising:
   at least one system on a chip (SoC) module comprising at least one controller, the SoC module being configured to perform n-channel rendering, identifying a number of speakers in an audio system and configure the speakers automatically based at least on part on speaker model, frequency range of a speaker, the SoC module being further configured to synchronize the speakers in the audio system; and
   at least one analog module configured to provide analog signals to an analog speaker.

2. The assembly of claim 1, wherein the modules further comprise:
   at least one wireless module configured to wirelessly communicate with one or more audio speakers;
   and at least one power over Ethernet (PoE) module configured to supply power and audio data to at least one speaker.

3. The assembly of claim 1, wherein the modules further comprise:
   at least one wireless module configured to wirelessly communicate with one or more audio speakers.

4. The assembly of claim 1, wherein the modules further comprise: at least one power over Ethernet (PoE) module configured to supply power and audio data to at least one speaker.

5. The assembly of claim 1, wherein at least one of the plural modules is implemented by a circuit card.

6. The assembly of claim 1, wherein at least one of the plural modules is implemented by a chip.

* * * * *